United States Patent Office 2,757,094
Patented July 31, 1956

2,757,094

LIQUID CLEANER AND POLISHER AND METHOD OF COMPOUNDING THE SAME

Charles Guss, Omaha, Nebr.

No Drawing. Application August 7, 1953,
Serial No. 373,066

2 Claims. (Cl. 106—8)

This invention relates to improvements in liquid cleaning and polishing compositions.

The primary object of this invention is the provision of an improved liquid cleaning and polishing composition consisting of an emulsified solution of dimethylpolysiloxane, in fluid form.

A further object of this invention is the provision of a cleaning and polishing compound particularly well adapted for the cleaning of glass, chromium, stainless steel and plastics such as "Lucite"; "Plexiglas"; "Polystyrene," the compound being adapted to be sprayed or rubbed thereon for polishing the surface with a high luster. The material after being polished with the compound has a thin coating on its surface which will prevent the adhesion of grease, oil, dust and water.

A further object of this invention is the provision of an improved liquid cleaning and polishing compound well adaptable for use in households, schools, hospitals, hotels, garages and many other places. It enables the polishing of surfaces less frequently than is now necessary because of the tendency of the liquid cleaning compound to leave a thin protective coating on the polished surface.

A further object of this invention is the provision of an emulsified liquid compound having a specific silicone as its active ingredient.

Other objects and advantages of the invention will be apparent during the course of the following detailed description.

The improved liquid cleaning and polishing compound is fabricated by blending together equal amounts of several emulsifiers, glycerol stearate and polyoxyethylene stearate. To (4) parts by weight of the mixed emulsifiers is added (35) parts by weight of a specific silicone, dimethylpolysiloxane in fluid form having the following structural formula:

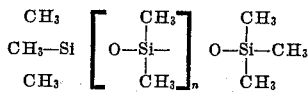

The ingredient dimethylpolysiloxane is a linear polymer which is end blocked with trimethylsiloxy end groups having a viscosity range of 200 to 500 centistokes at 25° C. The emulsifiers and the dimethylpolysiloxane, in fluid form, in the above proportions, for the optimum mixture, are then mixed slowly, to which 25 parts by weight of warm water is then added, very slowly, and subsequently stirred with a high speed stirring apparatus, such as an Eppenbach mixer or homogenizer. The compound at this stage has a butter-like phase, and this is critical. Subsequently water is added slowly to obtain an emulsion having 35% by weight of dimethylpolysiloxane. This gives a concentrated base or stock solution. To 1.74% by weight of this base solution there is then added 0.2% by weight of another emulsifier polyethylene glycol tertdodecylthioether and 98.06% warm soft water. This mixture is specifically processed by taking one-half of this warm soft water and mixing the concentrated base within it. Thereafter the emulsifier specified is added and then these ingredients are all violently agitated for approximately 15 minutes. Thereafter, the balance of the soft water is slowly added and the composition violently agitated for 10 more minutes. The mixture is then ready for bottling and use.

Variations in the ranges of the above specified ingredients and their proportions can be made. For instance, in the usable liquid cleaning solution dimethylpolysiloxane may comprise from 0.5% by weight to 15% by weight.

Furthermore, while several emulsifiers have been given, others capable of emulsifying the specific silicone may also be used.

The improved product is non-toxic and has the appearance and consistency of milk. It is not flammable and does not contain any harmful solvents, such as hydrocarbon solvents. It is free of abrasive materials which when dry leave traces of powder, such as fine silica. The product is mainly used for cleaning and polishing glass, "Plexiglas" and other synthetic transparent and translucent plastics having non-absorbent surfaces, such as chromium, stainless steel, etc.

The formula when completed comprises, for optimum conditions, the following

| | Percent by weight |
|---|---|
| Dimethylpolysiloxane (in fluid form) | 0.61 |
| Glycerol stearate | 0.035 |
| Polyoxyethylene stearate | 0.035 |
| Polyethylene glycol tertdodecylthioether | 0.200 |
| Water | 99.120 |
| Total | 100.0 |

Various changes in the proportions of parts in the cleaning compound may be made to the form of invention as above designated, and various changes in the ingredients may be made, without departing from the spirit of the invention or scope of the claims.

I claim:

1. A non-toxic aqueous emulsified cleaning and polishing product having the appearance and consistency of milk and adaptable for the polishing of non-adsorbent hard shiny surfaces, comprising the following ingredients and their respective proportions:

0.61% by weight dimethylpolysiloxane (in fluid form)
0.035% by weight glycerol stearate
0.035% by weight polyoxyethylene stearate
0.200% by weight polyethylene glycol tertdodecylthioether
99.120% by weight water 2. The process of compounding a liquid cleaning and polishing material which consists in blending equal amounts of glycerol stearate ond polyoxyethylene monostearate to provide an emulsifying medium, mixing 4 parts by weight of such emulsifying medium to 35 parts by weight of dimethylpolysiloxane in fluid form, mixing the resultant with 25% by weight of lukewarm water, subsequently diluting and mixing the resultant with water to obtain an emulsion having 35% by weight of dimethylpolysiloxane, subsequently mixing 1.74% of the thus obtained emulsified dimethylpolysiloxane to 0.2% by weight polyethylene glycol tertdodecylthioether and 98.06% warm soft water.

References Cited in the file of this patent

UNITED STATES PATENTS

| 2,523,281 | Currie | Sept. 26, 1950 |
| 2,546,168 | Hart | Mar. 27, 1951 |
| 2,584,413 | Baer et al. | Feb. 5, 1952 |
| 2,666,685 | Hommel et al. | Jan. 19, 1954 |
| 2,702,276 | Green | Feb. 15, 1955 |